(12) United States Patent
Naoi et al.

(10) Patent No.: US 10,109,431 B2
(45) Date of Patent: Oct. 23, 2018

(54) COMPOSITE OF METAL OXIDE NANOPARTICLES AND CARBON, METHOD OF PRODUCTION THEREOF, ELECTRODE AND ELECTROCHEMICAL ELEMENT EMPLOYING SAID COMPOSITE

(71) Applicant: NIPPON CHEMI-CON CORPORATION, Tokyo (JP)

(72) Inventors: Katsuhiko Naoi, Tokyo (JP); Wako Naoi, Tokyo (JP); Shuichi Ishimoto, Tokyo (JP); Kenji Tamamitsu, Tokyo (JP)

(73) Assignee: NIPPON CHEMI-CON CORPORATION (JP)

( * ) Notice: Subject to any disclaimer, the term of this patent is extended or adjusted under 35 U.S.C. 154(b) by 92 days.

(21) Appl. No.: 15/052,726

(22) Filed: Feb. 24, 2016

(65) Prior Publication Data

US 2016/0172124 A1    Jun. 16, 2016

Related U.S. Application Data

(63) Continuation of application No. 13/638,542, filed as application No. PCT/JP2011/001966 on Mar. 31, 2011, now Pat. No. 9,287,553.

(30) Foreign Application Priority Data

| Mar. 31, 2010 | (JP) | 2010-084644 |
| May 4, 2010 | (JP) | 2010-106051 |
| Nov. 8, 2010 | (JP) | 2010-250185 |

(51) Int. Cl.
   B82Y 40/00 (2011.01)
   C01B 25/45 (2006.01)
   (Continued)

(52) U.S. Cl.
   CPC ............. H01G 11/42 (2013.01); C01B 25/45 (2013.01); C01G 23/005 (2013.01); C01G 45/02 (2013.01);
   (Continued)

(58) Field of Classification Search
   None
   See application file for complete search history.

(56) References Cited

U.S. PATENT DOCUMENTS

| 6,528,033 B1 | 3/2003 | Barker et al. |
| 2005/0281727 A1 | 12/2005 | Yoshizawa et al. |

(Continued)

FOREIGN PATENT DOCUMENTS

| EP | 2 027 916 | 2/2009 |
| JP | 2006-032321 | 2/2006 |

(Continued)

OTHER PUBLICATIONS

Extended Search Report dated Apr. 16, 2014 for European Application No. 11762289.4 (6 pages).

(Continued)

*Primary Examiner* — Yoshitoshi Takeuchi

(57) ABSTRACT

A composite powder in which highly dispersed metal oxide nanoparticle precursors are supported on carbon is rapidly heated under nitrogen atmosphere, crystallization of metal oxide is allowed to progress, and highly dispersed metal oxide nanoparticles are supported by carbon. The metal oxide nanoparticle precursors and carbon nanoparticles supporting said precursors are prepared by a mechanochemical reaction that applies sheer stress and centrifugal force to a reactant in a rotating reactor. The rapid heating treatment in said nitrogen atmosphere is desirably heating to 400° C. to 1000° C. By further crushing the heated composite, its aggregation is eliminated and the dispersity of metal oxide (Continued)

Lantern plant-shaped lithium iron phosphate nanoparticles is made more uniform. Examples of a metal oxide that can be used are manganese oxide, lithium iron phosphate, and lithium titanate. Carbons that can be used are carbon nanofiber and Ketjen Black.

7 Claims, 15 Drawing Sheets

(51) Int. Cl.
| | | |
|---|---|---|
| C01G 45/02 | (2006.01) | |
| H01G 4/008 | (2006.01) | |
| H01G 11/42 | (2013.01) | |
| H01G 11/24 | (2013.01) | |
| H01G 11/50 | (2013.01) | |
| H01M 4/131 | (2010.01) | |
| H01M 4/1391 | (2010.01) | |
| H01M 4/48 | (2010.01) | |
| H01M 4/485 | (2010.01) | |
| H01M 4/505 | (2010.01) | |
| H01M 4/525 | (2010.01) | |
| H01M 10/0525 | (2010.01) | |
| H01G 11/36 | (2013.01) | |
| H01G 11/46 | (2013.01) | |
| H01M 4/36 | (2006.01) | |
| H01M 4/62 | (2006.01) | |
| C01G 23/00 | (2006.01) | |
| H01M 4/58 | (2010.01) | |

(52) U.S. Cl.
CPC ............ *H01G 4/008* (2013.01); *H01G 11/24* (2013.01); *H01G 11/36* (2013.01); *H01G 11/46* (2013.01); *H01G 11/50* (2013.01); *H01M 4/131* (2013.01); *H01M 4/1391* (2013.01); *H01M 4/366* (2013.01); *H01M 4/48* (2013.01); *H01M 4/485* (2013.01); *H01M 4/505* (2013.01); *H01M 4/525* (2013.01); *H01M 4/5825* (2013.01); *H01M 4/625* (2013.01); *H01M 10/0525* (2013.01); *B82Y 40/00* (2013.01); *C01P 2002/72* (2013.01); *C01P 2004/04* (2013.01); *Y02E 60/122* (2013.01); *Y02E 60/13* (2013.01); *Y02P 70/54* (2015.11); *Y10S 977/779* (2013.01); *Y10S 977/811* (2013.01); *Y10S 977/89* (2013.01); *Y10S 977/948* (2013.01)

(56) References Cited

U.S. PATENT DOCUMENTS

| | | | |
|---|---|---|---|
| 2009/0008244 A1 | 1/2009 | Suzuki et al. | |
| 2009/0136838 A1 | 5/2009 | Abe et al. | |
| 2010/0025627 A1* | 2/2010 | Naoi | B01F 7/164 |
| | | | 252/182.1 |
| 2011/0104553 A1* | 5/2011 | Pol | B82Y 30/00 |
| | | | 429/156 |

FOREIGN PATENT DOCUMENTS

| | | |
|---|---|---|
| JP | 2007-160151 | 6/2007 |
| JP | 2008-252002 | 10/2008 |
| JP | 2008-270795 | 11/2008 |
| JP | 2008-277120 | 11/2008 |
| JP | 2009-129719 | 6/2009 |
| JP | 2009-302044 | 12/2009 |
| WO | WO 2007-066581 | 6/2007 |

OTHER PUBLICATIONS

Office Action dated Nov. 15, 2016 for Corresponding Japanese Patent Application No. 2015-240707 with English language machine translation (13 pages).

* cited by examiner $Li_4Ti_5O_{12}$/CNF (70:30 w/w) composite under $N_2$ atmosphere Rate Capability of $Li_4Ti_5O_{12}$/CNF composite.

XRD patterns of $Li_4Ti_5O_{12}$/CNF composite

Snow pea-shaped lithium iron phosphate

Lantern plant-shaped lithium iron phosphate

COMPOSITE OF METAL OXIDE NANOPARTICLES AND CARBON, METHOD OF PRODUCTION THEREOF, ELECTRODE AND ELECTROCHEMICAL ELEMENT EMPLOYING SAID COMPOSITE

CROSS-REFERENCE TO RELATED APPLICATION

The present application is a continuation of U.S. patent application Ser. No. 13/638,542 filed on Sep. 28, 2012.

BACKGROUND OF THE INVENTION

1. Field of the Invention

The present invention relates to a composite of metal oxide nanoparticles and carbon, a method of production thereof, an electrode and an electrochemical element that employ this composite.

2. Description of Related Art

A carbon material etc. that stores and releases lithium is currently used as the electrode for lithium batteries, but there is a risk of decomposition of the electrolytic solution since the negative potential is lower than the reductive decomposition potential of hydrogen. Accordingly, as described in Patent Documents 1 or 2, the use of lithium titanate having higher negative potential than the reductive decomposition potential of hydrogen is being investigated, but lithium titanate has a problem of low output property. Accordingly, attempts are being made to improve output property by an electrode in which lithium titanate is made into nanoparticles and supported on carbon.

The inventions described in these Patent Documents are methods for applying sheer stress and centrifugal force to a reactant in a rotating reactor to allow promotion of chemical reaction (generally referred to as mechanochemical reaction), thereby yielding dispersed lithium titanate supported on carbon. In this case, for example, titanium alkoxide and lithium acetate which are the starting materials of lithium titanate, a carbon such as carbon nanotube or Ketjen Black, and acetic acid etc. are used as reactants.

Although the electrodes that use carbon supporting lithium titanate nanoparticles described in these Patent Documents exert superior output property, there are recent demands to further improve the output property and to improve the electric conductivity in this type of electrode.

There are also demands to produce a composite in which not only lithium titanate nanoparticles but other metal oxide nanoparticles are supported on carbon, and thereby obtain an electrode or an electrochemical element having a more superior output property. In particular, the use of a metal oxide cheaper than lithium such as manganese oxide is desired.

The present invention is proposed to solve the problems of the conventional technology as stated above, the object of which is to provide a composite of metal oxide nanoparticles and carbon that can yield an electrode or an electrochemical element that enables improvement of output property and electric conductivity, as well as a method of production thereof. In addition, another object of the present invention is to provide an electrode and an electrochemical element that employ said composite.

SUMMARY OF THE INVENTION

In order to achieve the said object, in a method for producing a composite of metal oxide nanoparticles and carbon according to the present invention, sheer stress and centrifugal force is applied to a solution including a starting material of metal oxide and carbon powder in a rotating reactor to allow reaction and obtain a composite powder in which highly dispersed metal oxide nanoparticle precursors are supported on carbon under nitrogen atmosphere, and the composite powder is rapidly heated under nitrogen atmosphere to allow progression of crystallization of metal oxide so that metal oxide nanoparticles having ultra thin film structure is highly dispersed and supported by the carbon. In this case, it is also aspects of the present invention that said rapid heating treatment is heating the composite under nitrogen atmosphere to 400-1000° C., and that the metal oxide nanoparticles have a thickness of 1 nm or less at 2-5 atomic layers level and is a crystal structure (ultra thin film structure) on a plate of 5-100 nm in diameter. Further, a composite produced with a method as above, as well as an electrode or an electrochemical element that this composite are encompassed in the present invention.

According to the present invention, good crystallization of metal oxide nanoparticles can be progressed by rapid heating treatment in the calcination step of carbon supporting the metal oxide nanoparticle precursors, and a crystal structure having a thickness of 1 nm or less at 2-5 atomic layers level on a plate of 5-100 nm in diameter is formed.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

(Mechanochemical Reaction)

The reaction method employed in invention is a mechanochemical reaction the similar present to the method shown in Patent Documents 1 and 2 previously filed for patent application by the present inventors, wherein sheer stress and centrifugal force are applied to a reactant in a rotating reactor during the chemical reaction process to allow promotion of chemical reaction.

Figure 20:
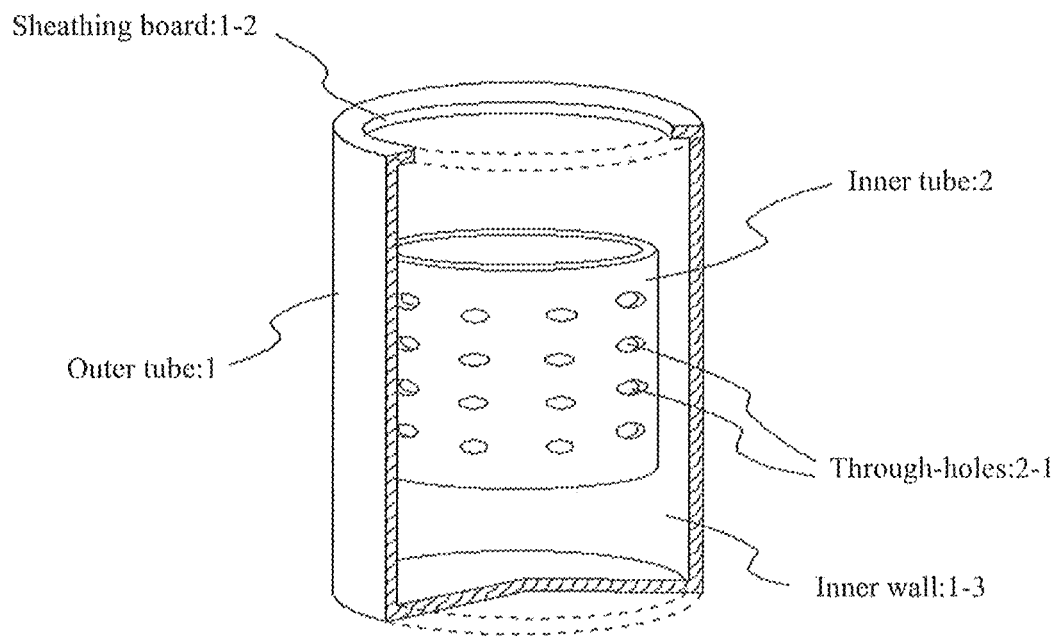
FIG. 20 is a perspective view showing an example of the reactor used in the production method of the present invention.

This reaction method can be performed employing for example the reactor as shown in FIG. 20. As shown in FIG. 20, the reactor consists of an outer tube 1 having a sheathing board 1-2 at the opening and a rotating inner tube 2 having through-holes 2-1. By introducing the reactant into the inner tube of this reactor and rotating the inner tube, the reactant inside the inner tube is transferred through the through-holes of the inner tube to the inner wall 1-3 of the outer tube by its centrifugal force. At this time, the reactant collides with the inner wall of the outer tube by the centrifugal force of the inner tube, and slides up to the upper portion of the inner wall in a thin film state. In this state, the sheer stress with the inner wall and the centrifugal force from the inner tube are both simultaneously applied to the reactant, mechanical energy is thereby applied to reactant. This mechanical energy is and a large the thin film thought to be converted into chemical energy necessary for reaction, the so-called activation energy, and the reaction is progressed in a short period of time.

In this reaction, since the mechanical energy applied to the reactant will be large when in a thin film state, the thickness of the thin film is 5 mm or less, preferably 2.5 mm or less, and further preferably 1.0 mm or less. The thickness of the thin film can be set by the width of the sheathing board and the amount of the reaction solution.

It is thought that this reaction method can be realized by the mechanical energy of sheer stress and centrifugal force applied to the reactant, and this sheer stress and centrifugal force are generated by the centrifugal force applied to the reactant inside the inner tube. Accordingly, the centrifugal force applied to the reactant inside the inner tube necessary for the present invention is 1500 N $(kgms^{-2})$ or higher, preferably 60000 N $(kgms^{-2})$ or higher, and further preferably 270000 N $(kgms^2)$ or higher.

In this reaction method, it is thought that chemical reaction can be promoted at a nonconventional speed due to the fact that the mechanical energies of both sheer stress and centrifugal force are simultaneously applied to the reactant and this energy is thereby converted into chemical energy.

(Metal Oxide)

Examples of a metal oxide for producing the metal oxide nanoparticles according to the present invention that can be used are manganese oxide MnO, lithium iron phosphate $LiFePO_4$, and lithium titanate $Li_4Ti_5O_{12}$. In addition, the use of a metal oxide represented by MxOz, AxMyoz, Mx(DO4)y, and AxMy (DO4)z (wherein M: metal element and A: alkali metal or lanthanoids) as other oxides is also possible.

In case of manganese oxide MnO, for example, a composite of manganese oxide nanoparticle precursors and carbon supporting the dispersed precursors are produced by said mechanochemical reaction with a manganese source such as sodium permanganate, manganese acetate, manganese nitrate, and manganese sulfate together with carbon as starting materials. By rapid heating of this composite under nitrogen atmosphere, a composite of manganese oxide, which is a metal oxide of the present invention and carbon is produced.

In case of lithium iron phosphate $LiFePo_4$, for example, a composite of lithium iron phosphate nanoparticle precursors and carbon supporting the dispersed precursors are produced by said mechanochemical reaction with a manganese source such as sodium permanganate, manganese acetate, manganese nitrate, and manganese sulfate together with carbon as starting materials. By rapid heating of this composite under nitrogen atmosphere, a composite of lithium iron phosphate which is a metal oxide of the present invention and carbon is produced.

In case of lithium titanate $Li_4Ti_5O_{12}$, for example, a titanium source such as titanium alkoxide, and a lithium source such as lithium acetate, lithium nitrate, lithium carbonate, and lithium hydroxide are used as starting materials, and the lithium titanate nanoparticle precursors are produced by said mechanochemical reaction. The lithium titanate nanoparticles of the present invention having oxygen defect sites doped with nitrogen are produced by heating these lithium titanate nanoparticle precursors under nitrogen atmosphere.

(Carbon)

By adding a given carbon in the reaction process, carbon supporting highly dispersed 5-100 nm lithium titanate can be obtained. In other words, a metal salt and a given reaction suppressor and carbon are introduced into the inner tube of the reactor, and the inner tube is rotated to mix and disperse the metal salt and the reaction suppressor and the carbon. A catalyst such as sodium hydroxide is further introduced while rotating the inner tube to advance hydrolysis and condensation reaction to produce a metal oxide, and this metal oxide and carbon are mixed in a dispersed state. Carbon supporting highly dispersed metal oxide nanoparticles can be formed by rapidly heating this at the end of the reaction.

The carbon employed here can include Ketjen Black, carbon black such as acetylene black, carbon nanotube, carbon nanohorn, amorphous carbon, carbon fiber, natural graphite, artificial graphite, activated carbon, mesoporous carbon, and a gas phase carbon fiber. A composite thereof can also be employed.

(Solvent)

Alcohols, water, or a mixed solvent thereof can be employed as the solvent. For example, a mixed solvent of acetic acid and lithium acetate dissolved in a mixture of isopropanol and water can be used.

(Reaction Suppressor)

When a metal alkoxide is used as the starting material, as described in Patent Document 2, a given compound that forms a complex with a given metal alkoxide can be added as the reaction suppressor, wherein said mechanochemical reaction is applied to the metal alkoxide. This can suppress the chemical reaction from being excessively promoted.

In other words, it was found that the reaction can be suppressed and controlled by adding to the metal alkoxide 1-3 moles of a given compound such as acetic acid that forms a complex therewith (relative to 1 mole of the metal alkoxide) to form a complex. Composite nanoparticles of a metal and an oxide, e.g. composite nanoparticles of lithium and titanium oxide which are lithium titanate precursors are produced by this reaction, and lithium titanate crystals are obtained by calcination thereof.

As stated above, it is thought that a chemical reaction can be suppressed from being excessively promoted by adding a given compound such as acetic acid as the reaction suppressor because a given compound such as acetic acid forms a stable complex with a metal alkoxide.

A material that can form a complex with a metal alkoxide includes a complexing agent represented by a carboxylic acid such as acetic acid, as well as citric acid, oxalic acid, formic acid, lactic acid, tartaric acid, fumaric acid, succinic acid, propionic acid, and levulinic acid, an amino polycarboxylic acid such as EDTA, and an aminoalcohol such as triethanolamine.

(Heating)

The present invention yields a composite that supports metal oxide nanoparticle precursors inside the carbon nanoparticle structure by a mechanochemical reaction, allows promotion of crystallization of metal oxide by heating this composite of metal oxide and carbon under nitrogen atmosphere, and improves the capacitance and output property of an electrode or an electrochemical element that uses this composite.

In other words, it was found that aggregation of metal oxide nanoparticles can be prevented and nanoparticles with small particle size are formed by rapidly heating from room temperature to 400-1000° C. in the calcination step of the obtained composite of metal oxide nanoparticle precursors and carbon nanoparticles. Rapid heating is rapidly heating under a low oxygen concentration atmosphere of about 1000 ppm to an extent that so that carbon is not oxidized. For example, rapid heating can be performed by for example introducing a small amount of a composite of metal oxide nanoparticle precursors and carbon nanoparticles into a calcination furnace set to the calcination temperature. The preferred temperature range of the heating temperature will differ depending on the type of metal oxide. In other words, crystallization of metal oxide proceeds well at said temperature range, wherein good crystallization progress cannot be attained at below this temperature, and metal oxide having good energy storage property cannot be obtained due to phase transition at over this temperature.

(Electrode)

The composite of metal oxide nanoparticles and carbon obtained by the present invention can be mixed and kneaded with a binder, molded, and made into the electrode of an electrochemical element, i.e. electric energy storage electrode. This electrode shows high output property and high capacitance property.

(Electrochemical Element)

An electrochemical element that can employ this electrode is an electrochemical capacitor or battery that employs an electrolytic solution containing metal ions such as lithium or magnesium. In other words, the electrode of the present invention can occlude and detach metal ions, and works as a negative electrode or positive electrode. Accordingly, an electrochemical capacitor or battery can be configured by employing an electrolytic solution containing metal ions, and employing as the counter electrode for example activated carbon as well as carbon or metal oxide which occludes and detaches metal ions.

EXAMPLES

The present invention will now be further specifically described by Examples.

Example 1

A mixed solution of 1 mole of manganese acetate, ethanol, and water was prepared. This mixed solution and Ketjen Black (KB) were introduced into a rotary reactor, the inner tube was rotated at a centrifugal force of 66,000 N ($kgms^{-2}$) for 5 minutes to form a thin film of the reactant on the inner wall of the outer tube, and sheer stress and centrifugal force were applied to the reactant to allow promotion of a chemical reaction, yielding KB supporting highly dispersed manganese oxide precursor.

By drying the obtained KB supporting highly dispersed manganese oxide precursors under vacuum at 80° C. for 17 hours, a composite powder in which highly dispersed manganese oxide precursors are supported on KB was obtained.

Figure 1:
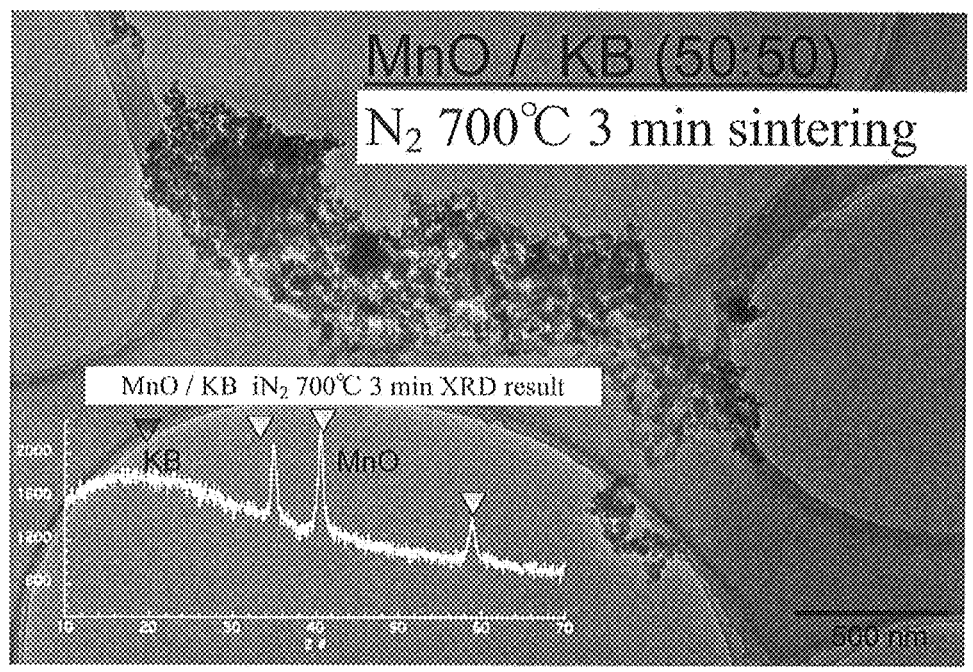
FIG. 1 is the result of XRD analysis and substitute for drawing which shows the TEM image of the composite of Example 1.

By rapidly heating the obtained composite powder in which highly dispersed manganese oxide precursors are supported on KB under nitrogen atmosphere to 700° C., crystallization of manganese oxide was allowed to progress, within 3 minutes of sintering as shown in FIG. 1, and a composite powder in which highly dispersed manganese oxide nanoparticles are supported on KB was obtained.

Figure 2:
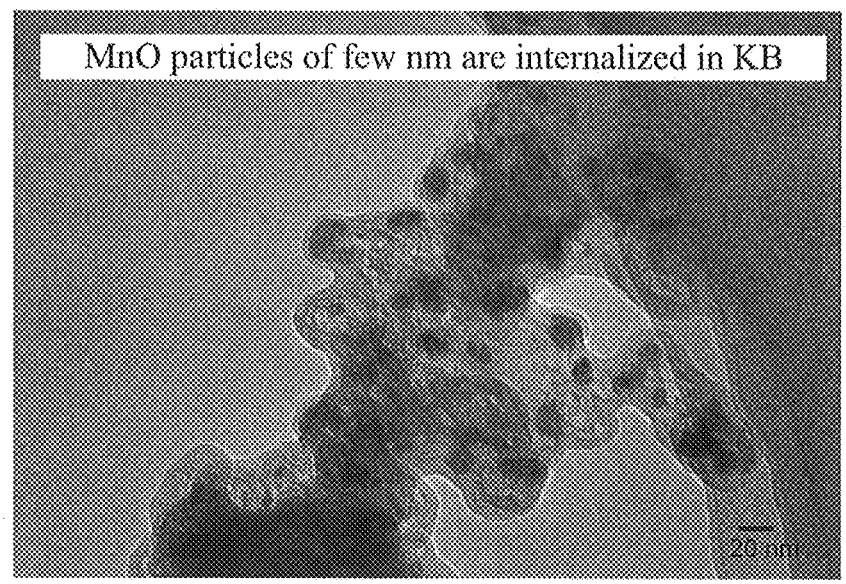
FIG. 2 is a photographic substitute for drawing which shows the magnified TEM image of other portions of the composite of Example 1.
Figure 3:
FIG. 3 is a photograph as substitute for drawing which shows the magnified TEM image of other portions of the composite Figure photographic of Example 1.

The result of XRD analysis and the TEM images of this composite powder of Example 1 are shown in FIGS. 1 to 3. It is seen from the XRD analysis shown in FIG. 1 that manganese oxide supported on KB is obtained.

As seen from the TEM images of FIGS. 1 to 3, carbon nanoparticles (Ketjen Black nanoparticles) indicate the building structure for graphite fragment, and in particular, it is seen from FIG. 2 that manganese oxide nanoparticles with a small diameter (few nm) are internalized in the carbon nanoparticles. In addition, according to FIG. 3, it can be observed that graphene (KB-Graphene) which is a thin film wherein graphite of Ketjen Black is stripped is formed, and manganese oxide nanoparticles have entered in between the graphene in a sandwiched state.

Subsequently, the composite powder of Example 1 configured as above was introduced into a SUS mesh welded onto a SUS plate together with polyvinylidene fluoride PVDF as the binder (MnO/K13/PVDF 40:40:20). This was set as the working electrode W.E. A separator as well as the counter electrode C.E. and Li foil as the reference electrode were placed on said electrode, and 1.0 M lithium hexafluorophosphate (LiPF$_6$)/ethylene carbonate EC:dimethyl carbonate DEC (1:1 w/w) was impregnated as the electrolytic solution to yield a cell. In this state, with working voltage at 0-2 V, the energy density was calculated from its charge and discharge property. The result showed a high energy density of 691 mAh/g (1 C) and 418 mAh/g (3 C) per manganese oxide.

Example 2-1

An aqueous solution of 1.0 mole of phosphoric acid and 1 mole of lithium acetate relative to 1 mole of iron acetate was prepared. Citric acid was employed here as the reaction suppressor. This solution and carbon nanofiber (CNF) were introduced into a rotary reactor, tube was rotated at a centrifugal force of (kgms$^{-2}$) for 5 minutes to form a thin film of the reactant on the inner wall of the outer tube, and sheer stress and centrifugal force were applied to the reactant to allow promotion of chemical reaction, yielding CNF supporting highly dispersed olivine-type lithium iron phosphate precursor. In this case, the amounts of iron acetate, phosphoric acid, lithium acetate, and CNF to be dissolved in the mixed solvent were set so that the composition of the composite obtained was lithium iron phosphate/CNF at a mass ratio (w/w) of 50/50.

By drying the obtained CNF supporting highly dispersed lithium iron phosphate precursors under vacuum at 80° C. for 17 hours, a composite powder in which highly dispersed lithium iron phosphate precursors are supported on CNF was obtained.

Figure 4:
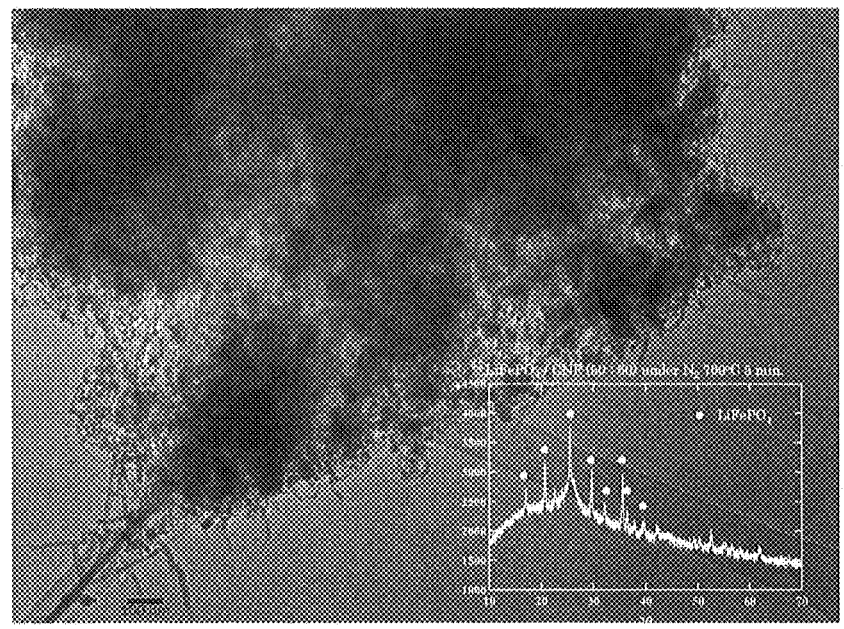
FIG. 4 is the result of XRD analysis and a substitute for drawing which shows the TEM image of the composite of Example 2-1.
Figure 5:
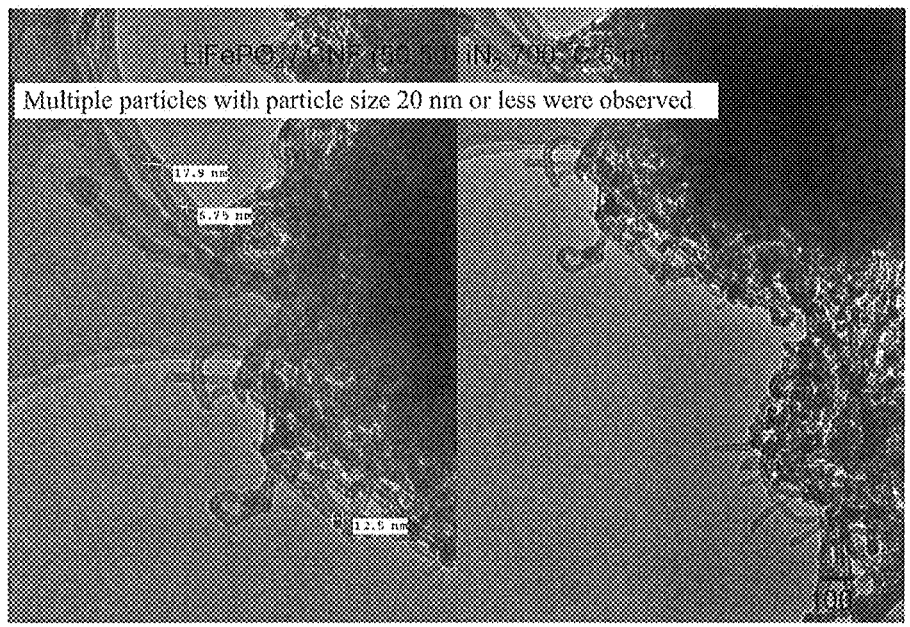
FIG. 5 is a photograph as substitute for drawing which shows the TEM image of other portions of the composite of Example 2-1.
Figure 6:
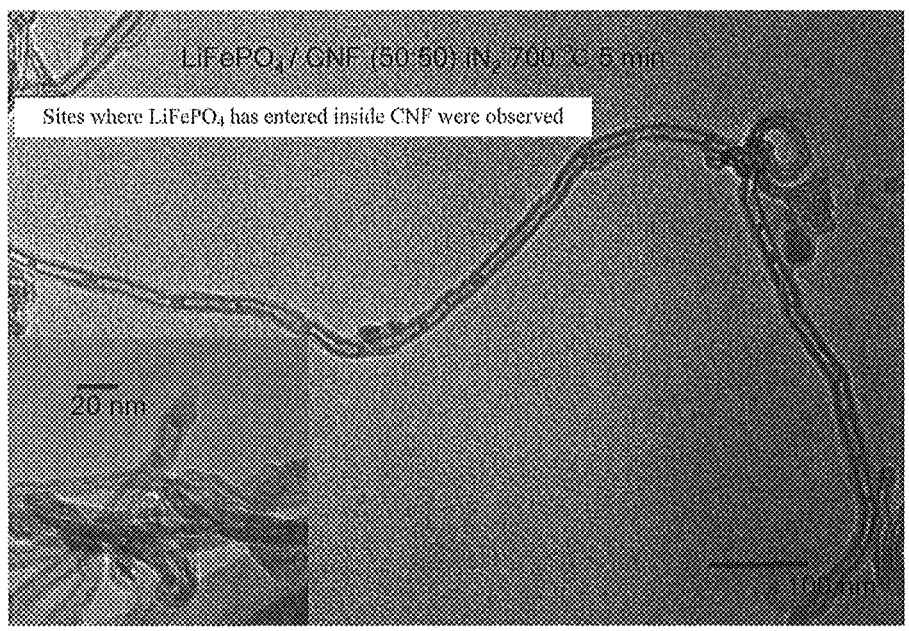
FIG. 6 is a photograph as substitute for drawing which shows the magnified TEM image of other portions of the composite of Example 2-1.

By rapidly heating the obtained composite powder in which highly dispersed lithium iron phosphate precursors are supported on CNF under nitrogen atmosphere to 700° C., for a time period of 5 minutes, crystallization of lithium iron phosphate was allowed to progress, yielding a composite powder in which highly dispersed lithium iron phosphate nanoparticles are supported on CNF, as shown in FIGS. 4 to 6.

Figure 8:
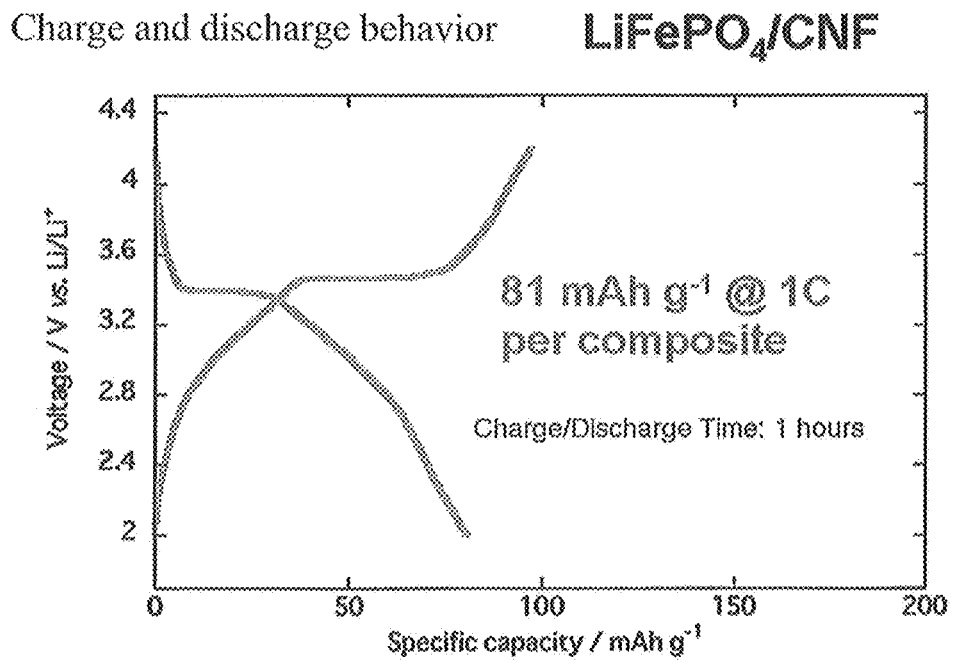
FIG. 8 is a graph showing the charge and discharge property of the electrochemical element that uses the composite of Example 2-1.
Figure 9:
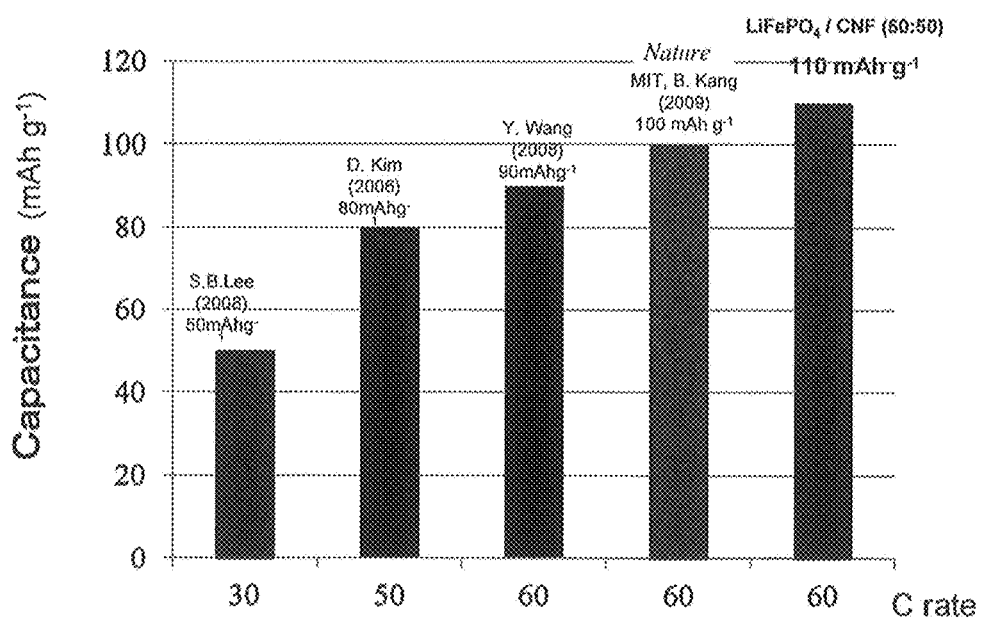
FIG. 9 is a graph comparing the charge and discharge property of the electrochemical element that uses the composite of Example 2-1 with that of a conventional electrochemical element.

The result of XRD analysis and the TEM images of this composite powder of Example 2-1 are shown in FIGS. 4 to 6, and the charge and discharge behavior and the capacitance calculated from this result are shown in FIGS. 8 and 9. It is seen from the XRD analysis shown in FIG. 4 that lithium iron phosphate supported on CNF is obtained.

Figure 7:
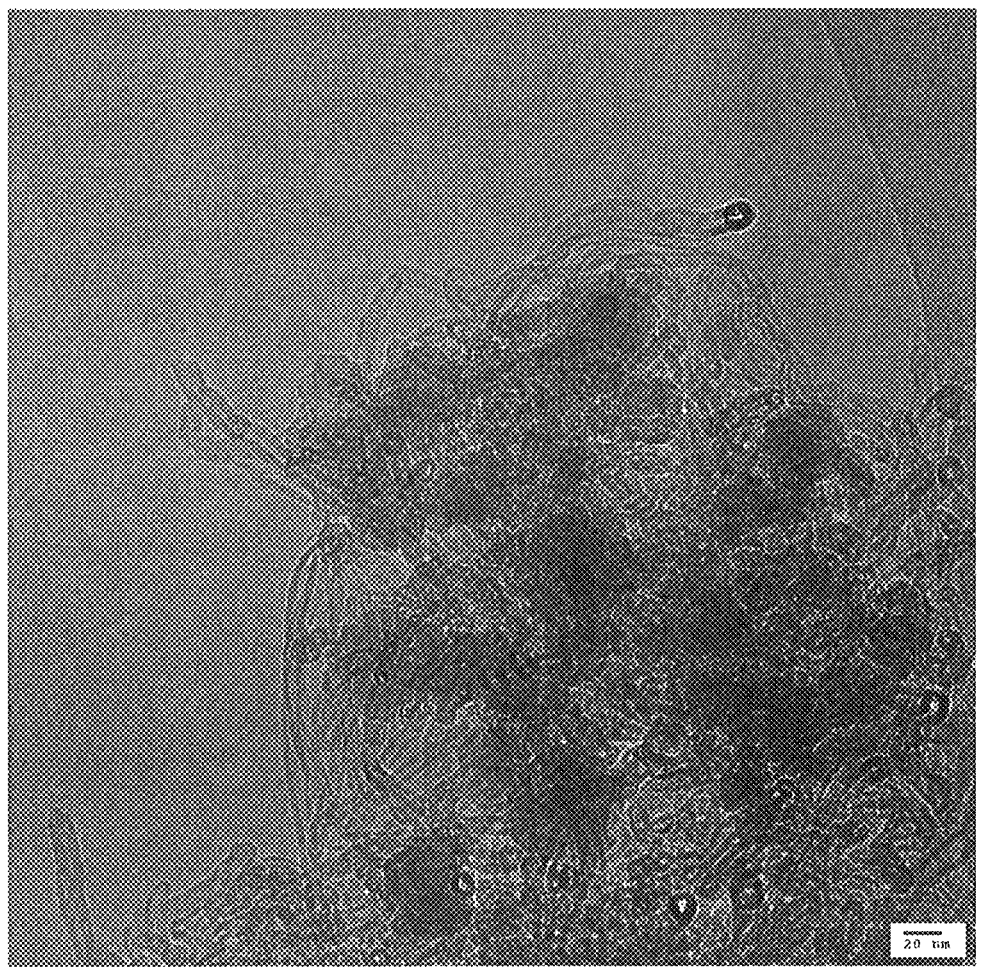
FIG. 7 is a photograph as substitute for drawing 15 which shows the high resolution TEM image of Example 2-1.
Figure 24:
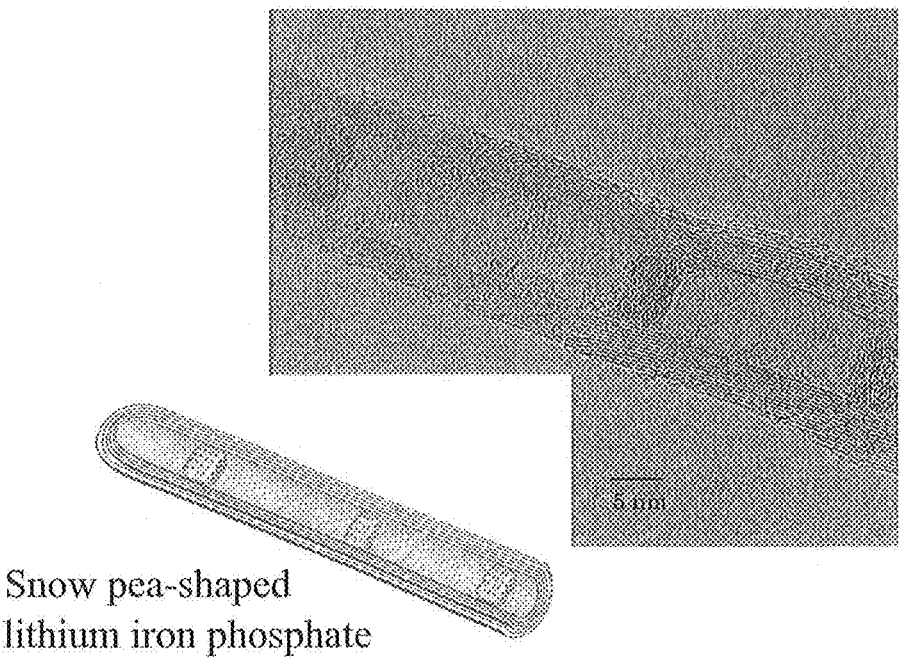
FIG. 24 is a magnified photograph of Example 2-1 and a schematic diagram thereof.

As seen from TME images of FIGS. 4 to 6, it can be observed that CNF nanoparticles show a structure entwined in a net. In addition, the high resolution TEM image is shown in FIG. 7. FIG. 24 is a further magnified photograph of FIG. 7 and a schematic diagram thereof, and as seen from this FIG. 24, lithium iron phosphate nanoparticles are contained inside a snow pea-like CNF. As seen from the figure, the crystal structure appears transparent, and it is supported on a lithium iron phosphate crystal structure (ultra thin film structure) having a thickness of 1 nm or less at 2-5 atomic layers level on a plate of 5-100 nm in diameter.

FIG. 8 is a graph showing the charge and discharge property of the electrochemical element that uses the composite of Example 2-1. In other words, the composite powder of Example 1 configured as above was introduced into a SUS mesh welded onto a SUS plate together with polyvinylidene fluoride PVDF as the binder (LiFePO$_4$/CNF/PVDF 40:40:20). This was set as the working electrode W.E. A separator as well as the counter electrode C.E. and Li foil as the reference electrode were placed on said electrode, and 1.0 M lithium hexafluorophosphate (LiPF$_6$)/ethylene carbonate (EC):dimethyl carbonate (DEC) (1:1 w/w) was impregnated as the electrolytic solution to yield a cell. In this state, with working voltage at 2.0-4.2 V, its charge and discharge property was investigated.

Figure 10:
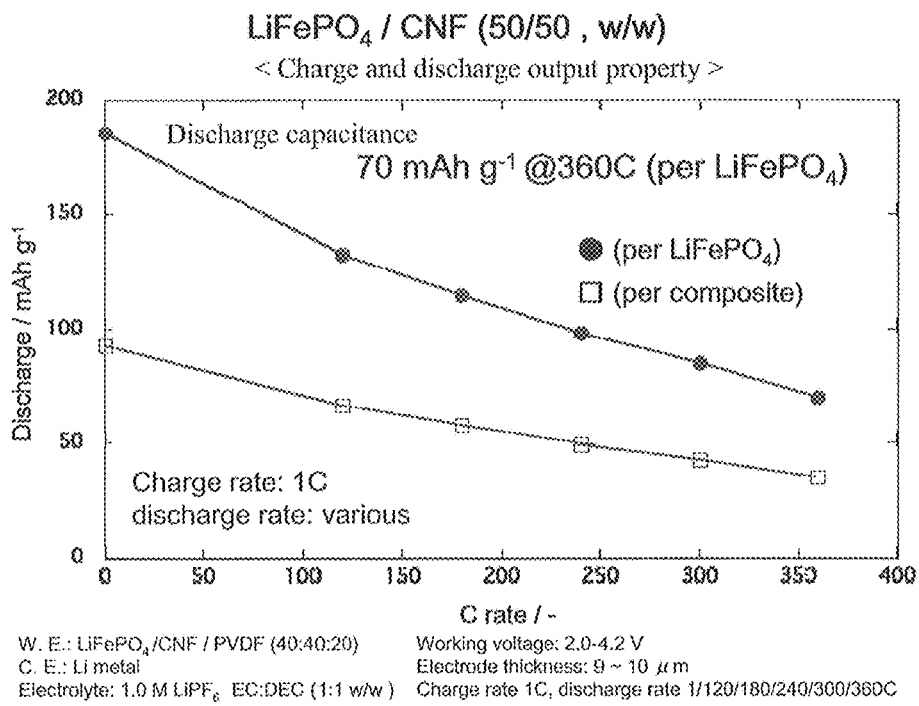
FIG. 10 is a graph showing the output property of the electrochemical element that uses the composite of Example 2-1.
Figure 11:
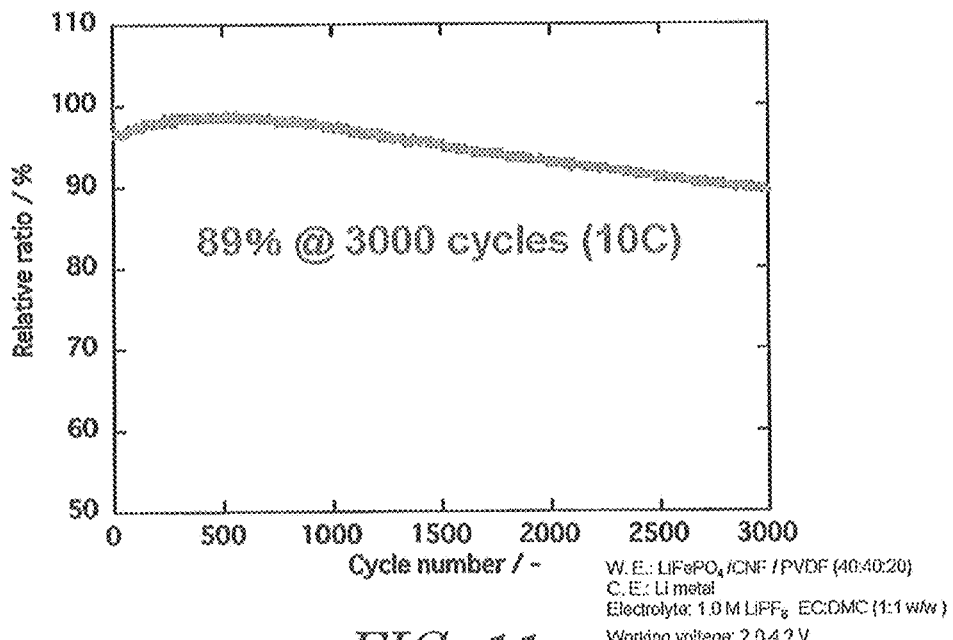
FIG. 11 is a graph showing the cycle property of the electrochemical element that uses the composite of Example 2-1.

As seen from this FIG. 8, a superior capacitance property of capacitance at 81 mAh/g per composite powder was confirmed. In addition, as shown in FIG. 9, a more superior output property was shown compared to a conventional product. In other words, FIG. 9 is a graph comparing the capacitance per lithium iron phosphate at 60 C of the electrochemical element that uses this lithium iron phosphate with the approximate capacitance of each previously reported technology. The discharge capacitance of the element that uses the composite of the present Example is increased compared to S. B Lee (2008), D. Kim (2006), Y. Wang (2008), and B. Kang (2009). In addition, FIG. 10 shows the output property and FIG. 11 shows the cycle property, and both output property and cycle property are good. The discharge output property of FIG. 10 was determined by measuring the discharge capacitance under a condition similar to the above FIG. 8 by varying the discharge rate to 1/120/180/240/300/360 C relative to charge rate 1 C. As seen from this FIG. 10, the discharge capacitance at 360 C shows high values of 70 mAh/g per lithium iron phosphate active material and 35 mAh/g per composite. The cycle property of FIG. 11 was capable of being maintained at 89% discharge capacitance even at 3000 cycles (10 C).

Figure 21:
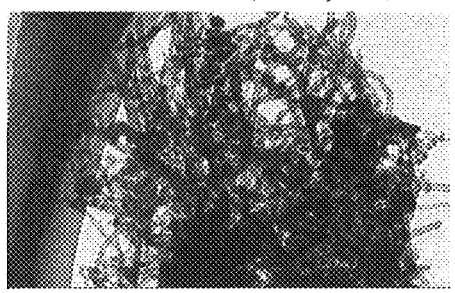
FIG. 21 is a photograph as substitute for drawing and graphs shows the micropore distribution of the composite of lithium iron phosphate nanoparticles and carbon of Example 2-1.
Figure 21:
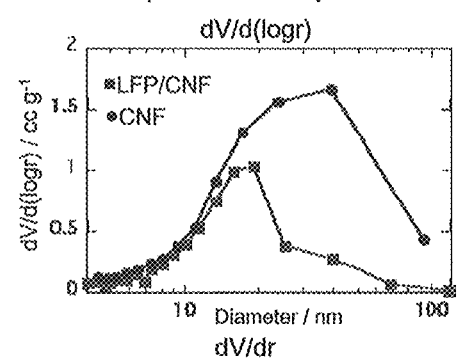
Figure 21:
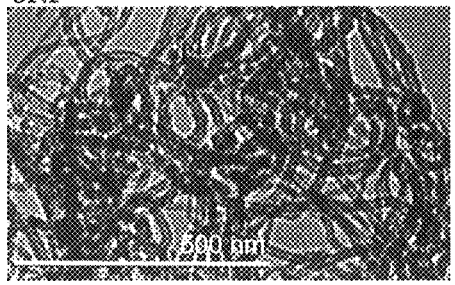
Figure 21:
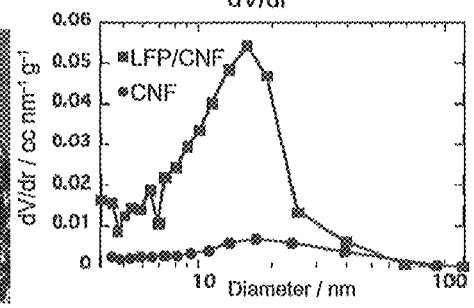

The micropore distribution was measured for the composite powder of the present Example by the BJH method (Barrett-Joyner-Halenda method). As shown in FIG. 21, the micropore distribution of CNF is 10-50 nm, while the micropore distribution of the composite of the present application was 20 nm, and it is seen that lithium iron phosphate nanoparticles are supported in the 50 nm voids of CNF and a composite having a 20 nm micropore distribution is formed. In other words, the micropore distribution of the composite of the present Example and CNF were calculated, and these mesopores were observed. In the graphs of FIG. 21, the squares are the plots for the composite and the circles are for CNF. First, it is seen that CNF has more 10-50 nm mesopores than the dV/d (log r) value. In addition, a large change in micropore distribution is seen when iron phosphate is composited with this CNF. Micropore size of 10-50 nm is drastically reduced, and micropore distribution at around 20 nm is maintained. This trend is also markedly seen with dV/dr. From this result, it is speculated that the supporting of iron phosphate on CNF occurs at CNF gaps of micropore size 10 50 nm, and a network of mesopores having micropore size of around 20 nm is further constructed. Accordingly, good ion path has been constructed in this composite electrode.

Example 2-2

Figure 12:
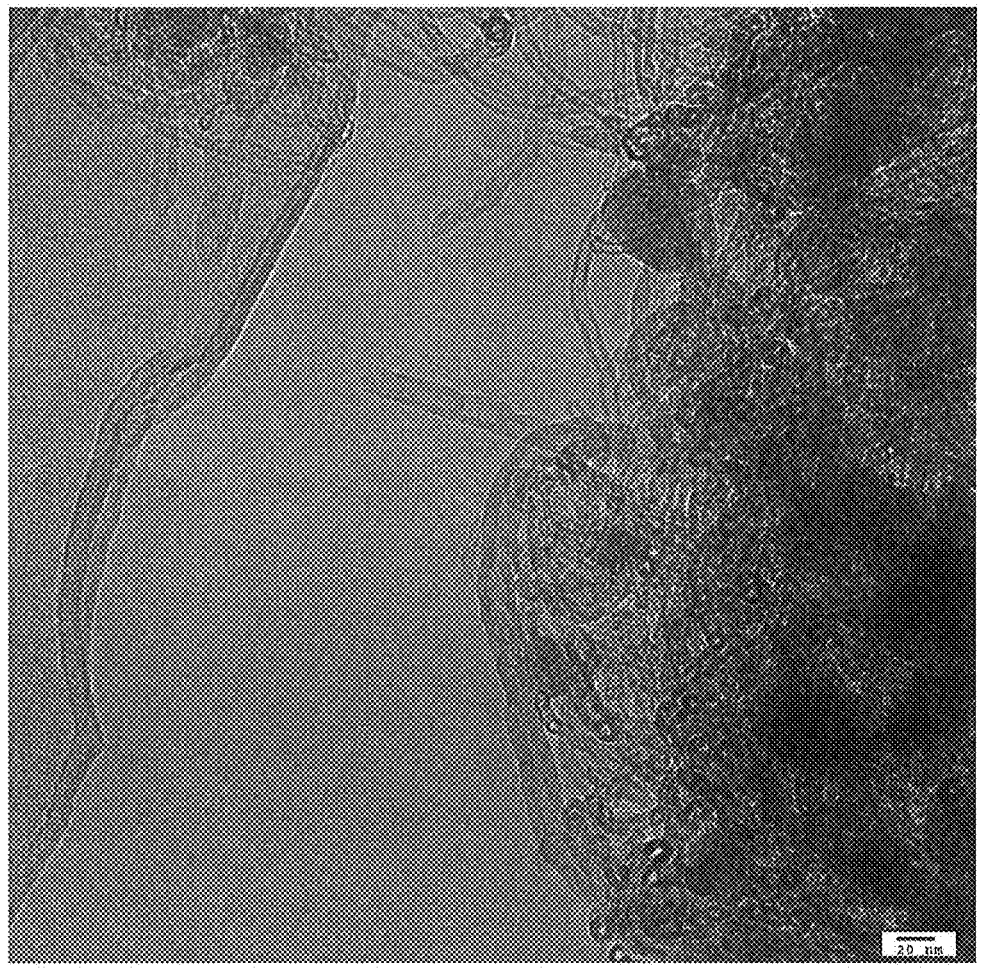
FIG. 12 is a photograph as substitute for drawing which shows the high resolution TEM image of the composite of Example 2-2.

A cell was prepared as in Example 2-1 except that lithium iron phosphate/CNF was set to be at a mass ratio (w/w) of 60/40. The capacitance of this cell was 71 mAh/g. In addition, the high resolution TEM image of this composite powder is shown in FIG. 12. As seen from this figure, a lithium iron phosphate crystal structure having a thickness of 1 nm or less at 2-5 atomic layers level on a plate of 5-100 nm in diameter is supported on CNF.

Example 2-3

Figure 13:
FIG. 13 is a photograph as substitute for drawing which shows the high resolution TEM image of the composite of Example 2-3.
Figure 25:
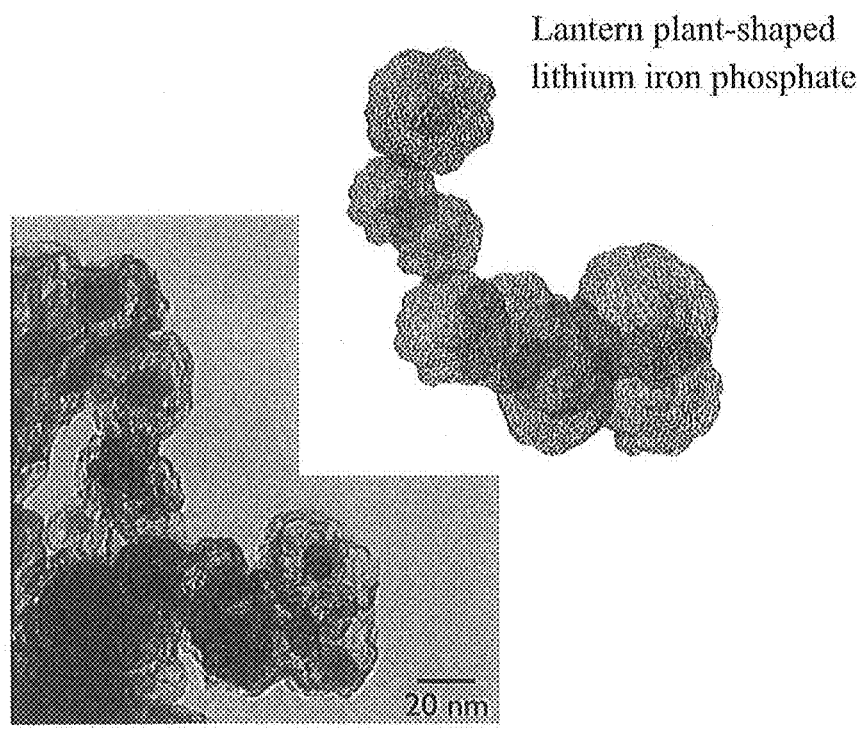
FIG. 25 is a high resolution TEM image of the composite powder of Example 2-3 and a schematic diagram thereof.

A cell was prepared as in Example 2-1 except that Ketjen Black was employed as the carbon. The capacitance of this cell was 108 mAh/g. In addition, the high resolution TEM image of this composite powder is shown in FIG. 13. As seen from this figure, a lithium iron phosphate crystal structure having a thickness of 1 nm or less at 2-5 atomic layers level on a plate of 5-20 nm in diameter is internalized in Ketjen Black. FIG. 25 shows the high resolution TEM image of this composite powder of Example 2-3 and a schematic diagram thereof. This Example 2-3 has a structure wherein one lithium iron phosphate nanoparticle is placed inside each lantern plant-like hollow spherical carbon.

Example 2-4

A cell was prepared as in Example 2-3 except that lithium iron phosphate/Ketjen Black was set to be at a mass ratio (w/w) of 60/40. The capacitance of this cell was 102 mAh/g.

Example 2-5

Figure 14:
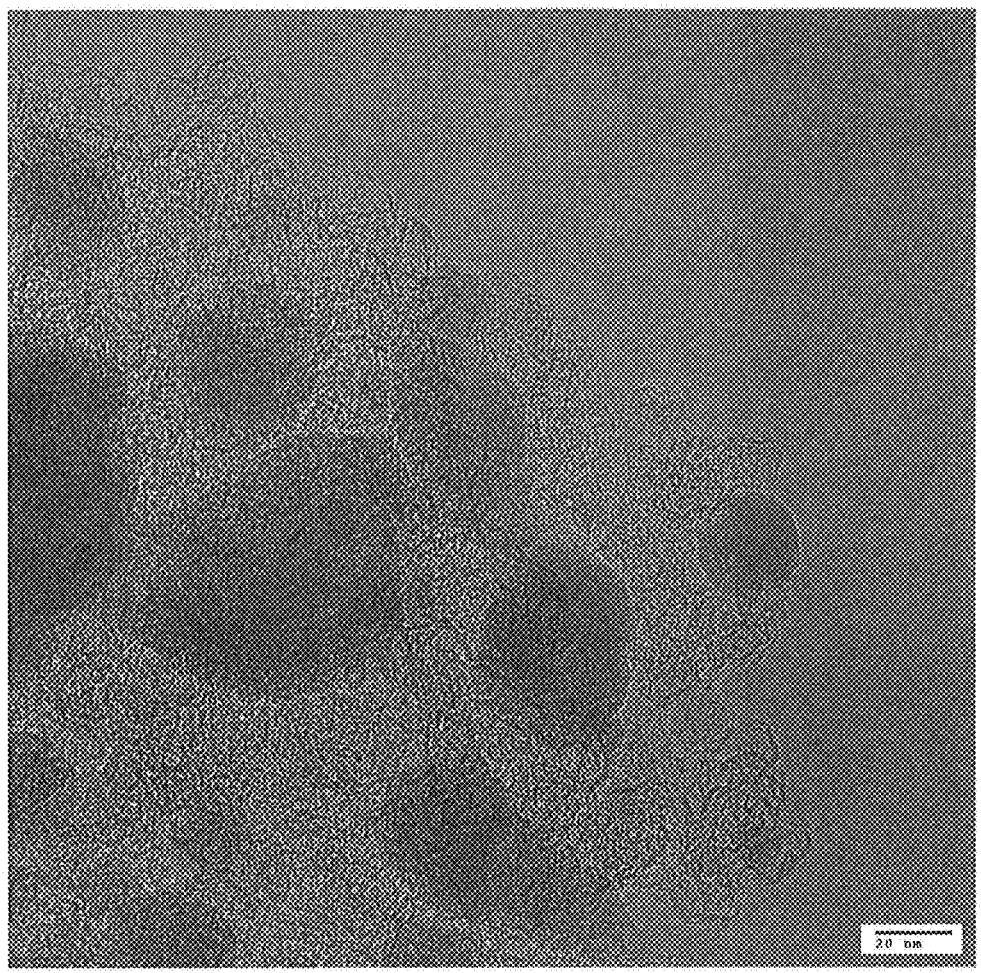
FIG. 14 is a photograph as substitute for drawing which shows the high resolution TEM image of the composite of Example 2-5.

A cell was prepared as in Example 2-1 except that BP2000 available from Cabot Corporation was employed as the carbon. The capacitance of this cell was 88 mAh/g. In addition, the high resolution TEM image of this composite powder is shown in FIG. 14. As seen from this Figure, a lithium iron phosphate crystal structure having a thickness of 1 nm or less at 2-5 atomic layers level on a plate of 5-100 nm in diameter is supported on BP2000.

Example 2-6

A cell was prepared as in Example 2-3 except that lithium iron phosphate/BP2000 was set to be at a mass ratio (w/w) of 60/40. The capacitance of this cell was 96 mAh/g.

Example 3

Acetic acid and lithium acetate in amounts of 1.8 moles of acetic acid and 1 mole of lithium acetate relative to 1 mole of titanium alkoxide were dissolved in a mixture of isopropanol and water to prepare a mixed solvent. This mixed solvent together with titanium alkoxide and carbon nanofiber (CNF) were introduced into a rotary reactor, the inner tube was rotated at a centrifugal force of 66,000 N (kgms$^{-2}$) for 5 minutes to form a thin film of the reactant on the inner wall of the outer tube, and sheer stress and centrifugal force were applied to the reactant to allow promotion of chemical reaction, yielding CNF supporting highly dispersed lithium titanate precursor. In this case, the amounts of titanium alkoxide and CNF dissolved in the mixed solvent were set so that the composition obtained was lithium titanate/CNF at of 70/30.

By drying the obtained CNF supporting highly dispersed lithium titanate precursors under vacuum at 80° C. for 17 hours, a composite powder under vacuum at in which highly dispersed lithium titanate precursors are supported on CNF was obtained.

The obtained composite powder in which highly dispersed lithium titanate precursors are supported on CNF was rapidly heated under nitrogen atmosphere to 800° C. to allow progression of crystallization of titanium oxide containing lithium, and a composite powder in which highly dispersed lithium titanate nanoparticles are supported on CNF was obtained.

Figure 15:
FIG. 15 is a photograph as substitute for drawing which shows the TEM image of the composite of lithium titanate nanoparticles and carbon of Example 3.

The TEM image of the carbon supporting lithium titanate nanoparticles of Example 3 obtained as above is shown in FIG. 15. In FIG. 15, it is seen that highly dispersed 5 nm-20 nm lithium titanate nanoparticles are supported on CNF.

In particular, as seen in the TEM image of FIG. 15, "the composite of lithium titanate nanoparticles and carbon" of the present invention takes a form of a "building structure for graphite fragment" of CNF connected together, and highly dispersed lithium titanate nanoparticles are supported on this structure.

Figure 16:
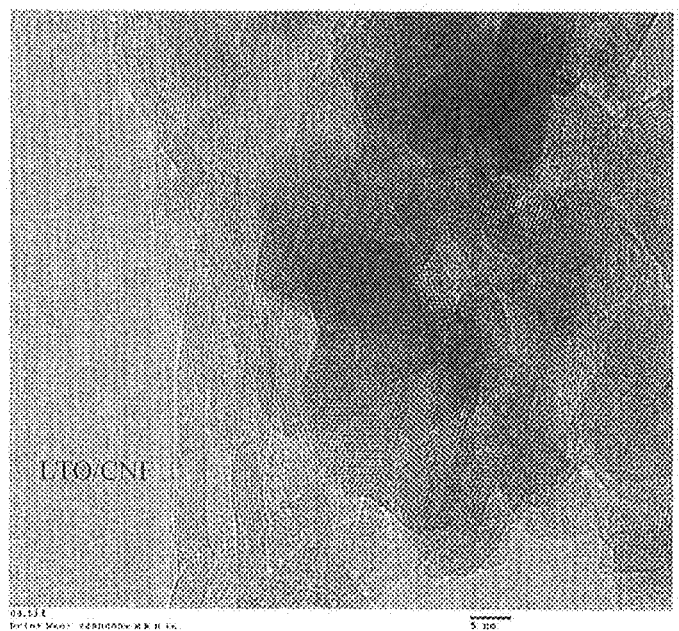
FIG. 16 is a photograph as substitute for drawing which shows the magnified TEM image of the composite of lithium titanate nanoparticles and carbon of Example 3.

FIG. 16 shows a figure of the CNF supporting highly dispersed lithium titanate precursors of Example 3 observed with a high resolution TEM. As seen from FIG. 16, the crystal structure of the lithium titanate nanoparticles appears transparent, and is a lithium titanate crystal structure having a thickness of 1 nm or less at 2-5 atomic layers level on a plate with a 5-10 nm side. Such ultra thin film structure has extremely thin thickness, extremely large property. Accordingly, it can show a high output property.

In other words, in regards to the surface area per volume, the surface area of a sheet having a thickness infinitely close to zero is the largest, and the sheet of Example 3 has a structure having a thickness of a few atomic layers level close to zero. The above ultra thin film structure is thought to be formed by applying sheer stress and centrifugal force to a solution comprising the starting material of metal oxide and carbon powder in a rotating reactor to allow reaction, and then subjecting to rapid heating treatment, but as observed with lithium iron phosphate, metal oxide nanoparticles other than lithium titanate also has an ultra thin film structure.

The composite powder obtained in Example 3 configured as above was introduced into a SUS mesh welded onto a SUS plate together with polyvinylidene fluoride PVDF as the binder ($Li_4Ti_5O_{12}$/CNF/PVDF 56:24:20). This was set as the working electrode W. E. A separator as well as the counter electrode C. E. and Li foil as the reference electrode were placed on said electrode, and 1.0 M lithium tetrafluoroborate ($LiBF_4$)/ethylene (EC):dimethyl carbonate (DEC) (1:1 w/w) was impregnated as the electrolytic solution to yield a cell.

Figure 17:
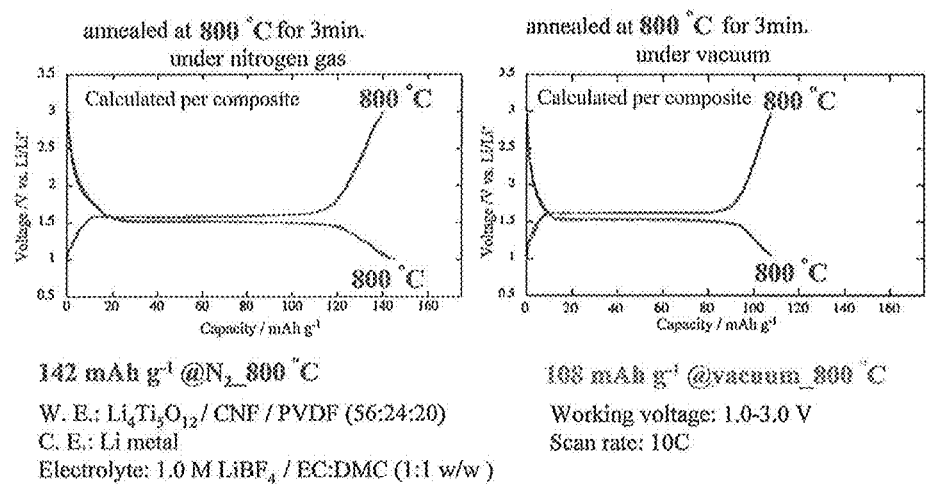
FIG. 17 is graphs showing the discharge behavior property of the composite of lithium titanate nanoparticles and carbon of Example 3.
Figure 18:
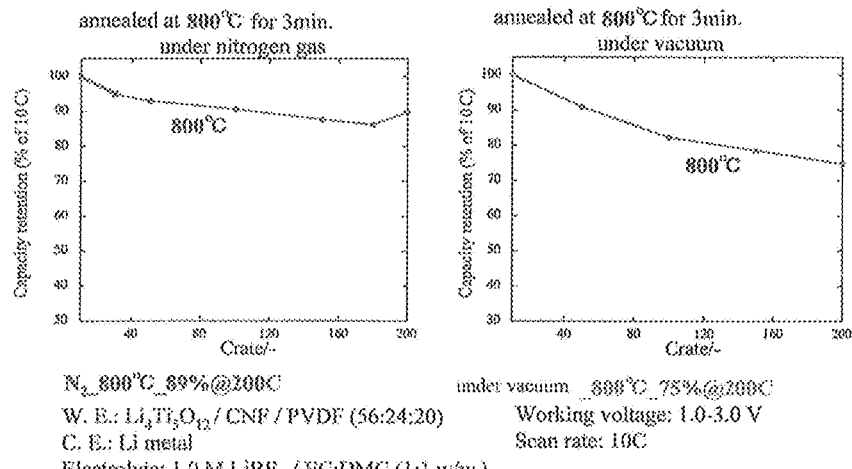
FIG. 18 is graphs showing the output property of the composite of lithium titanate nanoparticles and carbon of Example 3.

For cells having an electrode that employs the composite powder of Example 3 obtained as above and Comparative Example 1 heated under the same condition under vacuum, the charge and discharge behavior thereof and capacitance calculated based thereon are shown in FIG. 17, and the output property is shown in FIG. 18. In FIGS. 17 and 18, the left graph shows Example 3, and the right graph shows Comparative Example 1. In this case, the working voltage is 1.0-3.0 V and the scan rate is 10 C.

As seen from FIG. 17, a cell that uses the composite powder of Example 3 heated under nitrogen atmosphere has increased capacitance compared to a cell that uses the composite powder of Comparative Example 1 heated under vacuum. In particular, a cell that uses the composite powder of Comparative Example 1 heated under vacuum to 800° C. for 3 minutes had the largest capacitance among conventional technology, but the cells of Example 3 all had capacitance far greater than that of Comparative 15 Example 1, see heated under nitrogen gas to 800° C. for 3 minutes in FIG. 17.

FIG. 18 is graphs showing the output property of each cell with C-rate on the horizontal axis and discharge capacitance maintenance rate (%) on the 20 vertical axis. As seen from this FIG. 18, the discharge capacitance maintenance rate when the C-rate is at 200 C is far greater for the cell of Example 3 than the cell of Comparative Example 1.

Example 4

An electrochemical element was prepared by employing the working electrode prepared in Example 2-1 as the positive electrode, the working electrode prepared in Example 3 as the negative electrode, and 1.0 M lithium hexafluorophosphate (LiPF$_6$/ethylene carbonate (EC):dimethyl carbonate (DMC) (1:1 w/w) as the electrolytic solution. The result of measuring the energy density and power density for this electrochemical element is shown in FIG. 19.

Figure 19:
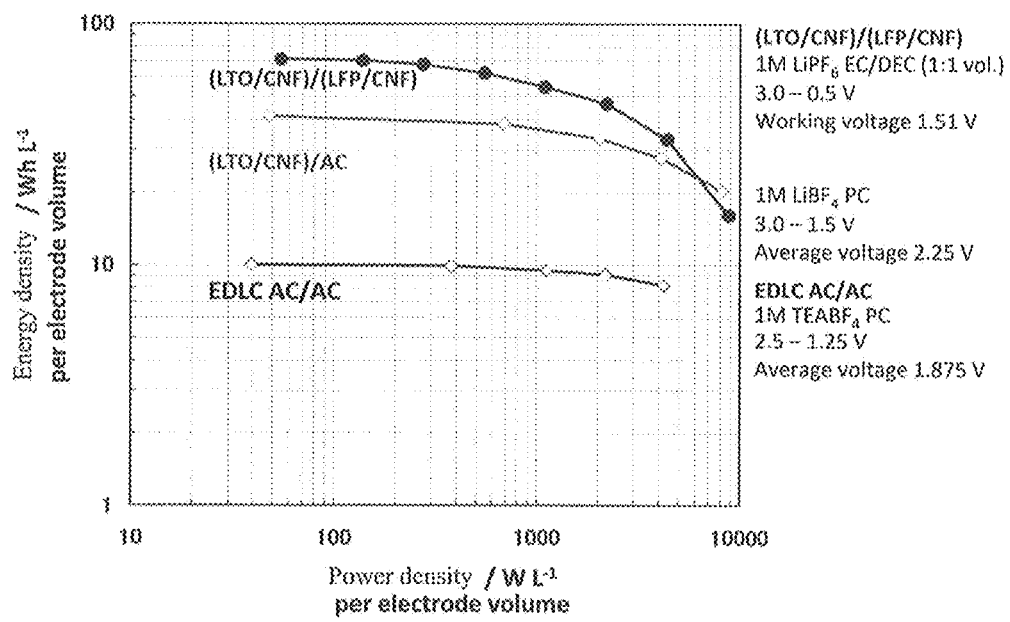
FIG. 19 is a graph showing the property of the high output energy storage device of Example 4.

This FIG. 19 is a Ragone Plot of measuring the energy density and the output property for each of the electrochemical element of Example 4, an electrochemical element that uses activated carbon electrode as the positive electrode and the working electrode produced in Example 3 as the negative electrode, and an electric double layer capacitor (EDLC) that uses activated carbon for the positive electrode and the negative electrode. As seen from this FIG. 19, the electrochemical element of Example 4 realizes a high output energy storage device having high energy density and high output property.

Example 5

Figure 22:
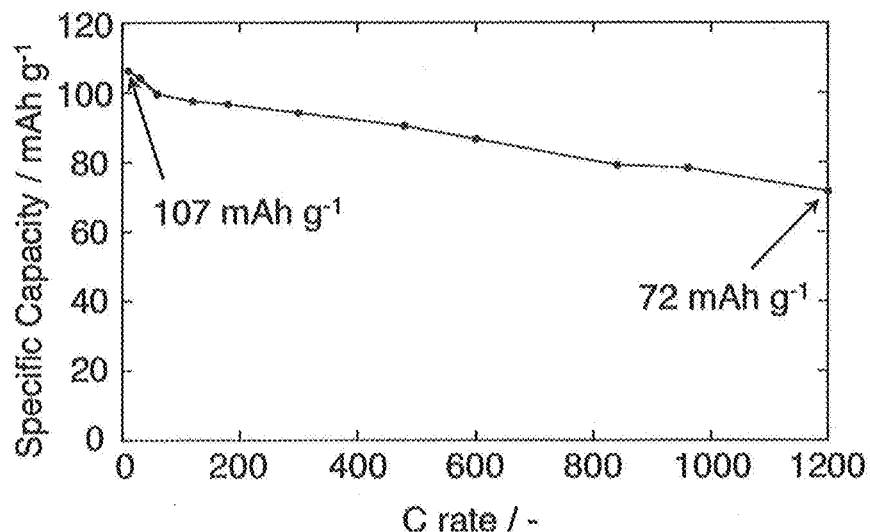
FIG. 22 is a graph showing the charge and discharge property of Example 5.

For the synthesis of the Li$_4$Ti$_5$O$_{12}$/CNF composite, Ti(OC$_4$H$_9$)$_4$ was employed as the titanium source and CH$_3$COOLi as the lithium source. These raw materials were subjected to ultracentrifugation treatment (UC treatment) together with 10-40 wt % of CNF relative to total Li$_4$Ti$_5$O$_{12}$/CNF and an organic solvent, etc. to yield a precursor. High crystalline Li$_4$Ti$_5$O$_{12}$/CNF composite nanoparticles were then obtained by high-temperature short-duration calcination. Electrochemical property was evaluated by a half cell that employs this composite made into an electrode by employing PVDF, Li metal as the counter electrode, and 1 M LiBF$_4$/EC+DMC 1:1 (in volume) as the electrolytic solution. As a result of charge and discharge test, the output property was found to be dependent on the weight ratio on Li$_4$Ti$_5$O$_{12}$. In addition, as seen from FIG. 22, 81% (87 mAh/g) of the 10 C capacitance at 600 C that demands high output property was maintained, and further 68% (72 mAh/g) capacitance at 1200 C was maintained.

Figure 23:
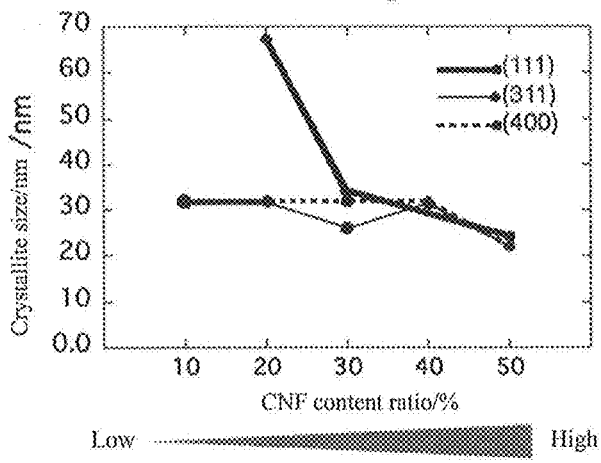
FIG. 23 is a graph showing the result of XRD analysis of Example 5.

As a result of XRD analysis of this composite of Example 5, as shown in FIG. 23, the crystal size of (111) face with CNF content ratio of 20% was larger than that of 30-50%, and it was confirmed that the lithium titanate nanoparticle crystal has an ultra thin film structure with large (111) face.

What is claimed is:

1. A composite of metal oxide nanoparticles and carbon, wherein each of the metal oxide nanoparticles is placed inside Ketjen Black of a separate hollow spherical carbon structure having an exterior rough surface configuration around the metal oxide nanoparticles,
the mass ratio (w/w) of the metal oxide nanoparticles to the Ketjen Black is set at 50/50 to 60/40.

2. The composite of metal oxide nanoparticles and carbon according to claim 1 where a lithium iron phosphate crystal structure having a thickness of 1 nm or less and a 2-5 atomic layer level is internalized in the Ketjen Black of the hollow spherical carbon structure.

3. The composite of metal oxide nanoparticles and carbon according to claim 2 wherein the metal oxide nanoparticles are lithium iron phosphates.

4. An electrode that employs the composite of metal oxide nanoparticles and carbon according to claim 1.

5. An electrochemical element that employs the electrode according to claim 4.

6. The electrochemical element according to claim 5 that employs lithium iron phosphate LiFePO$_4$ as a positive electrode active material and lithium titanate Li$_4$Ti$_5$O$_{12}$ as a negative electrode active material.

7. A cell that employs the composite, of metal oxide nanoparticles and carbon according to claim 1 where said cell is formed with a capacitance of 102 mAh/g.

* * * * *